R. H. UPSON.
VALVE.
APPLICATION FILED JUNE 28, 1918.
1,318,001. Patented Oct. 7, 1919.
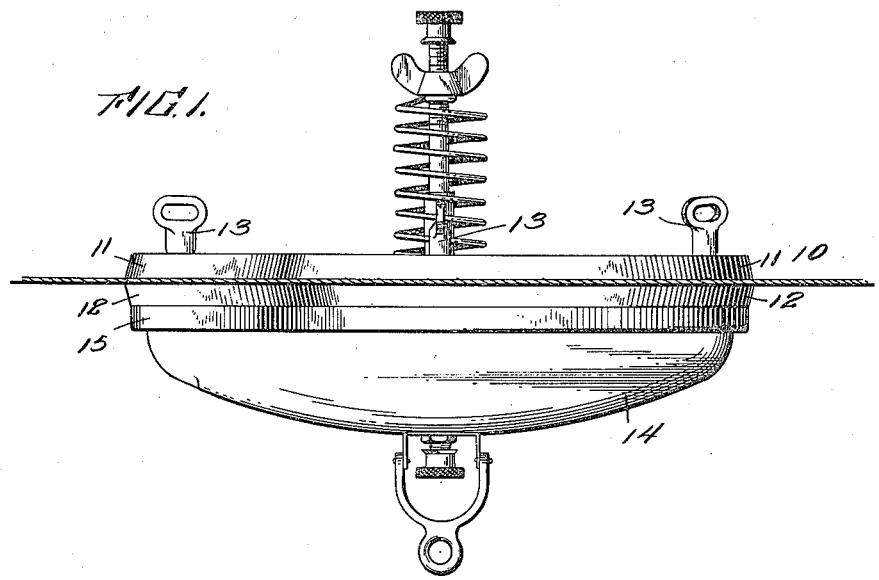
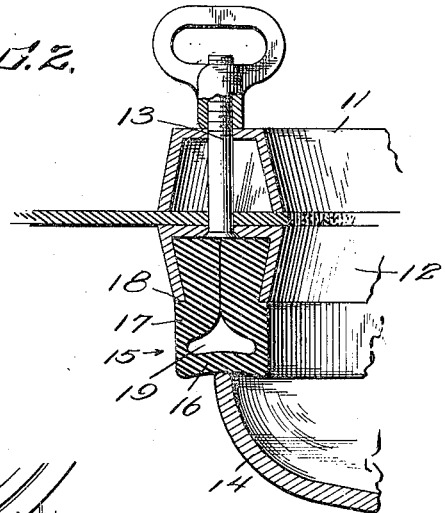
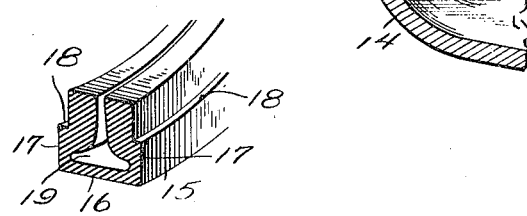
Inventor
RALPH H. UPSON
his Attorney

UNITED STATES PATENT OFFICE.

RALPH H. UPSON, OF AKRON, OHIO, ASSIGNOR TO THE GOODYEAR TIRE & RUBBER COMPANY, OF AKRON, OHIO, A CORPORATION OF OHIO.

VALVE.

1,318,001.  Specification of Letters Patent.  Patented Oct. 7, 1919.

Application filed June 28, 1918. Serial No. 242,416.

*To all whom it may concern:*

Be it known that I, RALPH H. UPSON, a citizen of the United States, residing at Akron, in the county of Summit and State of Ohio, have invented new and useful Improvements in Valves, of which the following is a specification.

My present invention relates to improvements in gas and air valves as used in connection with the controlling of the gas and air in dirigibles and the like.

The present seat or gasket as now used in valves of this type usually consists of a flat strip of rubber interposed between the valve cap proper and the valve flange and is of such nature that when the valve cap is closed, it becomes embedded in the rubber gasket for the purpose of preventing the escape of the gas or air as will be understood.

This gasket does not always prove effective as often foreign matter such as dirt, dust or other foreign elements will be collected on the gasket which will, in time, prevent the valve cap from becoming tightly seated in the gasket.

The principal object of my present invention is to provide a gasket of such a nature that it will, at all times, provide sufficient resiliency to permit the effective seating of the valve cap regardless of whether or not there is a deposit of foreign matter upon the gasket. Another object is to provide a gasket that may be quickly and easily replaced should it so be desired.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Figure 1 is a side elevation of an improved gas valve showing the gas envelop proper in section;

Fig. 2 is a transverse section through the periphery of the valve and valve seat; and Fig. 3 is a detail perspective of a portion of the gasket.

In the drawings, the fabric 10 is clamped between a pair of annular U-shaped rings or flange members 11 and 12 and is securely held in a clamped position by a plurality of bolts and thumb nuts 13. The flange 11 consists of an inverted U-shaped channel iron having its free edges in contact with the fabric 10 and is drilled at spaced intervals on its top surface for the reception of the bolts 13 as clearly seen in Fig. 2. The other flange member 12 also consists of an inverted U-shaped channel iron and is so disposed that the bight portion is brought into contact with the opposite side of the fabric of the balloon envelop 10 and forms a seat for the open edges of the first mentioned flange 11 as will be understood. The top surface of the flange 12 is also drilled at corresponding intervals for the reception of the up-set ends of the clamping bolts 13.

The gasket 15, which forms the principal feature of my present invention, consists of a flat seat portion 16 which terminates in a pair of upstanding end portions or side walls 17. About midway up the side wall portions 17 an offset is formed designated as 18 and is adapted to seat against the slightly compressed free edges of the flange 12 as will later be described. The upper ends of the side walls terminate in thickened extremities and in such a manner that when the gasket is in the unapplied position, the inner edges almost meet as shown in Fig. 3. The inner portion of the gasket 15 is formed hollow having a groove similar to an inverted T with the horizontal portion adjacent the body or seat portion 16.

In applying the gasket to the flange 12, it is first, thoroughly cemented on its thickened outer edges and on the side walls down to the shoulders 18, which are then compressed together and inserted between the slightly compressed free edges of the flange 12 until the shoulders 18 are firmly seated in position against the edges of the flanges. As soon as the pressure upon the gasket is released, it will expand and completely fill the flange 12 and adapt itself to the configuration of the flange as will be apparent upon reference to Fig. 2. The cement will soon set, thereby holding the gasket in a secured position and it is then ready for use.

When the cap 14 engages the bottom surface 16 of the gasket, it will be apparent that the air pocket 19 formed within the gasket, will be compressed to a slight extent, thereby allowing the cap 14 to quickly and perfectly adjust itself and form a perfect seal. Should any foreign matter such as dirt, dust, etc., collect upon the surface 16, while the valve is opened, the resilience of the gasket together with the air cushion, will allow the cap 14 upon the closing of the valve to impress itself into the gasket at these particular points to a greater extent than at the places free of the foreign matter and thereby effectively form the seal.

I claim:

1. In a valve of the character set forth, the combination of a channel ring having the free end portions of the walls thereof compressed, a hollow gasket having a flat seat portion and a pair of outstanding side walls, said side walls being pressed into the channel ring and provided with offsets against which the edges of the walls of the channel ring bear.

2. In a valve of the character set forth, the combination of a channel ring having the free end portions of the walls thereof converged, a hollow gasket having a flat seat portion, and a pair of outstanding side walls, said side walls being pressed into the channel ring.

3. In a valve of the character set forth, the combination of a hollow, resilient gasket, retaining means for said gasket, said gasket having free side walls compressed within said retaining means, the hollow portion of said gasket lying entirely outside said retaining means.

4. In a valve of the character set forth, the combination of a hollow resilient gasket having a substantially flat face, spaced retaining elements for said gasket, said gasket having free side walls compressed between said spaced elements, the hollow portion of said gasket lying wholly outside said elements.

5. In a valve of the character set forth, the combination of a hollow, resilient gasket, spaced flanges for retaining said gasket, said gasket having free side walls compressed between said flanges, the hollow portion of said gasket lying entirely outside said flanges.

6. In a valve of the character set forth, the combination of a hollow, resilient gasket, retaining means for said gasket comprising converging walls, said gasket having free side walls compressed between said converging walls, the hollow portion of said gasket lying wholly outside said converging walls.

7. In a valve of the character described, a valve member, a seat with which said valve is adapted to coöperate, said seat comprising a hollow, resilient gasket having side walls joined at the seat portion only, said side walls being spaced apart when said gasket is in inoperative position but brought in contact when said gasket is in operative position.

8. In a valve of the character described, a valve member, a channel member, a hollow, resilient gasket having a substantially flat portion, with which said valve is adapted to coact when seated, said gasket having free side walls joined at one end to said flat portion and compressed within said channel member to hold said gasket in place.

In witness whereof, I have hereunto set my hand in the presence of two subscribing witnesses.

RALPH H. UPSON.

Witnesses:
R. S. TROGNER,
W. R. SPRAUSY.